United States Patent [19]

Grossman

[11] Patent Number: 4,458,499
[45] Date of Patent: Jul. 10, 1984

[54] ABSORPTION HEAT PUMP SYSTEM

[75] Inventor: Gershon Grossman, Oak Ridge, Tenn.

[73] Assignee: The United States of America as represented by the United States Department of Energy, Washington, D.C.

[21] Appl. No.: 388,874

[22] Filed: Jun. 16, 1982

[51] Int. Cl.³ .............................................. F25B 15/00
[52] U.S. Cl. .......................................... 62/148; 62/476
[58] Field of Search ................................. 62/148, 476

[56] References Cited

U.S. PATENT DOCUMENTS

| | | | |
|---|---|---|---|
| 3,837,174 | 9/1974 | Miyagi et al. | 62/148 X |
| 4,094,355 | 6/1978 | Blytas | 62/476 X |
| 4,179,895 | 12/1979 | Shimokawa et al. | 62/476 X |
| 4,246,762 | 1/1981 | Bourne | 62/476 X |
| 4,329,851 | 5/1982 | Bourne | 62/476 X |
| 4,363,219 | 12/1982 | Koseki et al. | 62/476 X |

Primary Examiner—Lloyd L. King
Attorney, Agent, or Firm—Earl L. Larcher; Stephen D. Hamel; Michael F. Esposito

[57] ABSTRACT

The efficiency of an absorption heat pump system is improved by conducting liquid from a second stage evaporator thereof to an auxiliary heat exchanger positioned downstream of a primary heat exchanger in the desorber of the system.

3 Claims, 5 Drawing Figures

ABSORPTION HEAT PUMP SYSTEM

BACKGROUND OF THE INVENTION

This invention, which resulted from a contract with the United States Department of Energy, relates to an absorption heat pump system for utilizing heat in a liquid to increase the temperature of a portion of the same liquid or the temperature of another liquid.

Very large quantities of waste heat at low temperatures are rejected daily from industrial plants throughout the world. Other sources of low-temperature heat are also available (e.g., geothermal and solar) with a total energy value equivalent to many millions of tons of fossil fuel. In order to make effective use of this heat, it is often necessary to boost its temperature from about 60° C. (typically) to 120° C. Different heat pump cycles have been considered for doing this, the most common of which require electricity as a source of power. The absorption cycle is one of the more promising and has the advantage of using part of the waste heat to power itself, while boosting the temperature of the rest.

SUMMARY OF THE INVENTION

An object of this invention is to improve the efficiency of an absorption heat pump system for raising the temperature of a normally unusable source of heat energy, such as water at a temperature of about 140° F.

This object is achieved, in accordance with the invention, by a two stage absorption heat pump system wherein liquid which is not vaporized in the second stage evaporator thereof is conducted to an auxiliary heat exchanger positioned under a primary heat exchanger in the desorber of the system.

DETAILED DESCRIPTION OF A PREFERRED EMBODIMENT OF THE INVENTION

Figure 1:
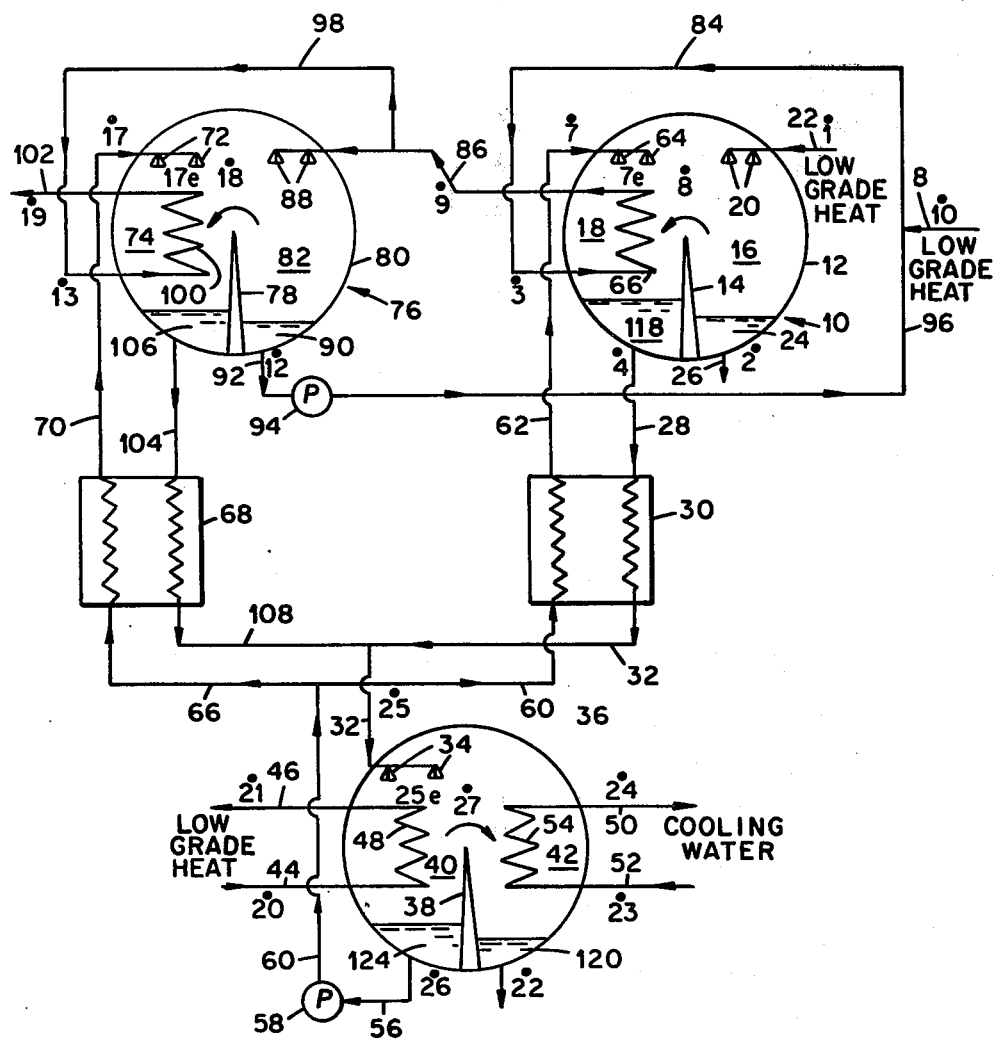
FIG. 1 is a schematic representation of a two-stage absorption heat pump system in conventional form.

As evident from FIG. 1, a conventional two-stage absorption heat pump system employs two evaporator-/absorber stages, both served by a single desorber/condenser apparatus. Two-stage absorption heat pumps can be built in other arrangements, but the illustrated apparatus is a preferred and convenient configuration. Reference number 10 designates a first stage evaporator-/absorber unit comprising a vessel 12 provided with a barrier 14 that extends partially across the central portion thereof and thus divides the space therein into two communicating sections, namely, flash chamber (or evaporator) 16 and an absorber section 18. A liquid at a comparatively low temperature is discharged in the form of fine droplets into flash chamber 16 from a suitable distributor means such as a plurality of spray nozzles 20 connected to the source of this liquid by a conduit 22. The portion 24 of the aforementioned liquid which is not vaporized in the evaporator is removed therefrom through a conduit 26.

A conduit 28 communicates with the interior of vessel 12 at the lower portion of the absorber side thereof and extends to a heat exchanger 30, which is generally referred to as a recuperator in an absorption heat pump system. Liquid which enters recuperator 30 through conduit 28 passes through a conduit 32 to another distributor which is also comprised of a plurality of spray nozzles 34 and which is located in a second vessel 36. As in vessel 12, a barrier 38 divides the interior of vessel 36 into two communicating sections, which in the latter vessel constitute a desorber section 40 and a condenser section 42. Inlet and outlet conduits 44,46 respectively conduct a low-temperature heating liquid into and out of a primary heat exchanger 48 positioned under distributor nozzles 34 in desorber 40, and inlet and outlet conduits 50,52 respectively conduct coolant into and out of a heat exchanger 54 in condenser 42. A conduit 56 communicates with the interior of vessel 36 at the lower portion of the desorber side thereof and extends to a pump 58, and a conduit 60 extends from the pump to recuperator 30. Liquid which enters recuperator 30 through conduit 60 passes through a conduit 62 to a distributor comprised of a plurality of nozzles 64, the latter being disposed above a heat exchanger 66 in absorber 18 of the first stage vessel 12. However, only part of the liquid which passes through pump 58 flows to nozzles 64, the remainder of this liquid being diverted through a conduit 66 which is connected to conduit 60 and a second recuperator 68. From the recuperator this diverted liquid then flows through a conduit 70 to a plurality of distributor nozzles 72 located in the absorber 74 of a second stage evaporator/absorber unit generally designated by reference number 76. As in vessel 12 of the first stage evaporator/absorber unit 10, a barrier 78 extends partially across the central portion of the containment vessel 80 of the second stage evaporator/absorber unit 76 and thus divides the space therein into the communicating absorber section 74 and evaporator section 82.

Low temperature liquid from the same source connected to conduit 22 (or from a separate low-temperature source) is also supplied by means of a conduit 84 to heat exchanger 66 in absorber 18 of first stage unit 10. After being heated in heat exchanger 18, part of this liquid flows through a conduit 86 to distributor nozzles 88 in evaporator 82 of second stage unit 76. The remainder of the heated liquid flows along a different path as will be described hereinafter. Reference number 90 designates the liquid which is discharged from nozzles 88 but not vaporized in evaporator 82, this liquid being drawn off from vessel 80 through a conduit 92 to a pump 94 and then flowing through a conduit 96 connected to conduit 84. Thus liquid not vaporized in evaporator 82 of second stage unit 76 is added to the low-temperature liquid flowing through conduit 84 to heat exchanger 66 in absorber 18 of first stage unit 10.

As previously mentioned, part of the liquid which has been elevated in temperature in heat exchanger 66 flows to spray nozzles 88. However, a conduit 98 connects with conduit 86 and conducts the remainder of the heated liquid to the heat exchanger 100 in absorber 74 of second stage unit 76, wherein its temperature is further increased. A conduit 102 carries the twice-heated liquid from heat exchanger 100 to a point where its energy is used.

A conduit 104 communicates with the interior of second stage vessel 80 at the lower portion of the absorber side thereof and conducts liquid 106 from said vessel to recuperator 68. Liquid which enters recuperator 68 through conduit 104 passes through a conduit 108 to conduit 32, where it is added to the liquid flowing from the absorber of a first stage unit 10 to nozzles 34 in desorber 40.

Figure 3:
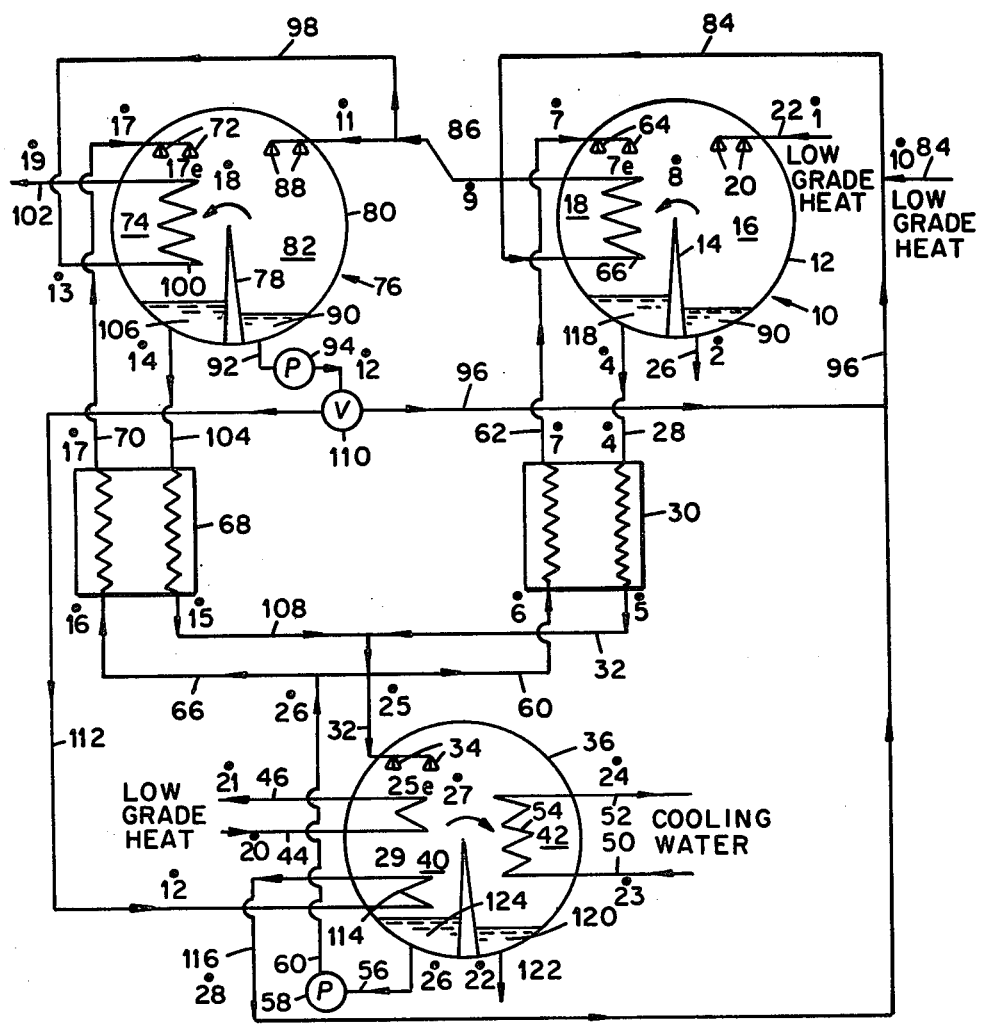
FIG. 3 is a schematic representation of a two-stage absorption heat pump system constructed in accordance with the principles of the invention.

FIG. 3 illustrates a two stage absorption heat pump system which includes the same components which have been identified in the above description (these components being designated by the same reference numbers used for corresponding components in FIG. 1) but which differs from the conventional absorption heat pump system in having an auxiliary heat exchanger 114 in its desorber 40. As will be shown hereinafter, the routing of a liquid stream to the auxiliary heat exchanger increases the efficiency of an absorption heat pump. In the improved apparatus, a valve 110 is connected to conduit 96 and to a conduit 112 which extends to the inlet of auxiliary heat exchanger 114 positioned under primary heat exchanger 48 in desorber 40. Lastly, a conduit 116 is connected at one end thereof to the outlet of auxiliary heat exchanger 14 and at the other end thereof to conduit 96.

OPERATION OF PREFERRED EMBODIMENT OF THE INVENTION

Because of their common use in absorption heat pump systems, water will be assumed to be the liquid that is vaporized in the evaporators 16,82 of the described apparatus, and a solution of lithium bromide and water will be assumed to be the liquid that absorbs water vapor in absorbers 18,74.

In first stage evaporator/absorber unit 10 of both the conventional absorption heat pump system illustrated in FIG. 1 and the improved system illustrated in FIG. 3, the lithium bromide/water absorbent solution is discharged in the form of droplets from nozzles 64 in absorber 18 and absorbs the water vapor which is generated in evaporator 16 and which flows into absorber 18 as indicated by the arrow above barrier 14. The heat generated by absorption of water into the absorbent liquid is transferred at heat exchanger 66 to the stream of water entering the heat exchanger through conduit 84.

Water 24 which is discharged from nozzles 20 but which is not converted to vapor in evaporator 16 accumulates in the bottom of vessel 12 and is drawn therefrom through conduit 26, as mentioned hereinbefore. Absorbent liquid which is diluted in absorber 18 by absorbing water vapor accumulates in the bottom of vessel 12 on the opposite side of barrier 14 and is designated by reference number 118. This diluted absorbent liquid flows through conduits 28 and 32 to nozzles 34 of desorber 40 and is discharged therefrom in the form of droplets. The pressure in vessel 36 is lower than that in vessel 12. In desorber 40 water absorbed in the absorbent liquid in absorber 18 is evaporated from the absorbent liquid and flows into condenser 42 as indicated by the arrow above barrier 38. Coolant flowing through heat exchanger 54 condenses the water vapor released from the absorbent liquid, and the condensate, which is designated by reference number 120, is drawn off through conduit 122. Part of the lithium bromide/water solution 124 which has been concentrated in desorber 40 is pumped by pump 58 through recuperator 30, where it is heated by the diluted absorbent solution flowing through the heat exchanger and then recycled to nozzles 64. The remainder of the concentrated absorbent liquid is directed through conduit 66 to recuperator 68, where it is heated by diluted absorbent solution 106 flowing from vessel 80 to the heat exchanger through conduit 104 and then passed through conduit 70 to nozzles 72 in absorber 74 of second stage evaporator/absorber unit 76. From recuperator 68 the diluted stream of absorbent liquid from second stage evaporator/absorber unit 76 flows through conduit 108 to conduit 32, where it is added to diluted absorbent liquid flowing from first evaporator/absorber unit 10 to nozzles 34 of desorber 40.

As mentioned hereinbefore, water which enters heat exchanger 66 of first stage absorber 18 is heated herein. In both the conventional apparatus illustrated in FIG. 1 and the improved apparatus illustrated in FIG. 3, part of this heated water flows to nozzles 88 of second stage evaporator 82 and the remainder flows through conduit 98 to heat exchanger 100 of second stage absorber 74. However, the two systems differ from each other with respect to the routing of water 90 which is discharged from nozzles 88 in vessel 80 but which is not vaporized in evaporator 82. In the conventional apparatus illustrated in FIG. 1, all of this water 90 is pumped by pump 94 through conduit 96 to conduit 84, where it is added to low-temperature water flowing through the last-mentioned conduit to heat exchanger 66 of first stage absorber 18. In the improved apparatus illustrated in FIG. 3, part of the water 90 which is not vaporized in evaporator 82 is pumped by pump 94 through conduit 96 to heat exchanger 66 and the remainder of this water is pumped through conduit 112 to auxiliary heat exchanger 114 of desorber 40 and thence to heat exchanger 66 of absorber 18 through conduits 116, 96, and 84. The advantages attained by directing a portion or all of the water 90 which is not vaporized in second stage evaporator 82 through the auxiliary heat exchanger 114 in desorber 40 can best be shown by reference to FIGS. 2 and 4, which are equilibrium diagrams for the lithium bromide/water absorbent solution used in the heat absorption cycles performed in the systems illustrated in FIGS. 1 and 3, respectively.

Figure 2:
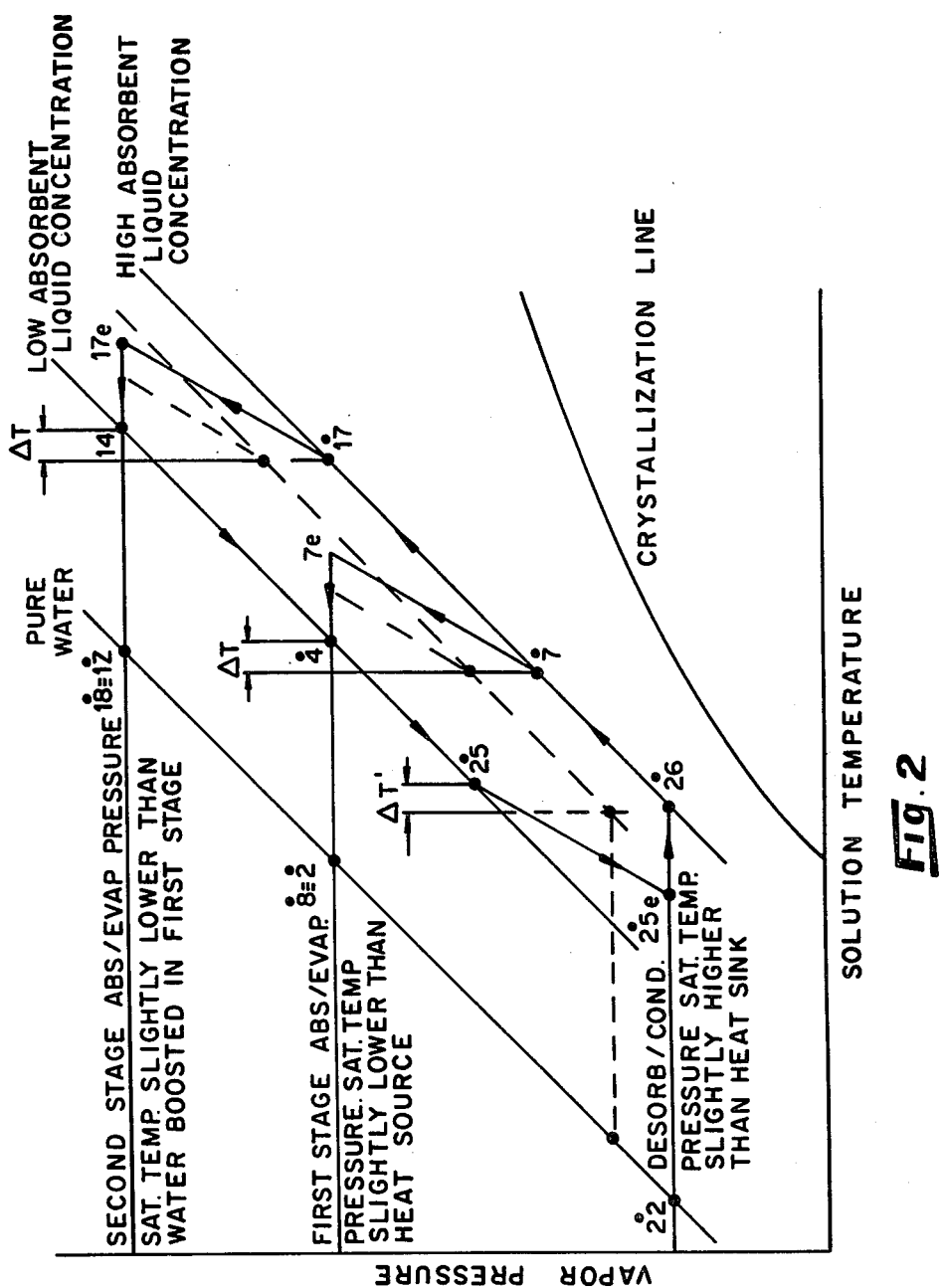
FIG. 2 is an equilibrium diagram for a common working fluid (water and lithium bromide) employed in the apparatus illustrated in FIG. 1.
Figure 4:
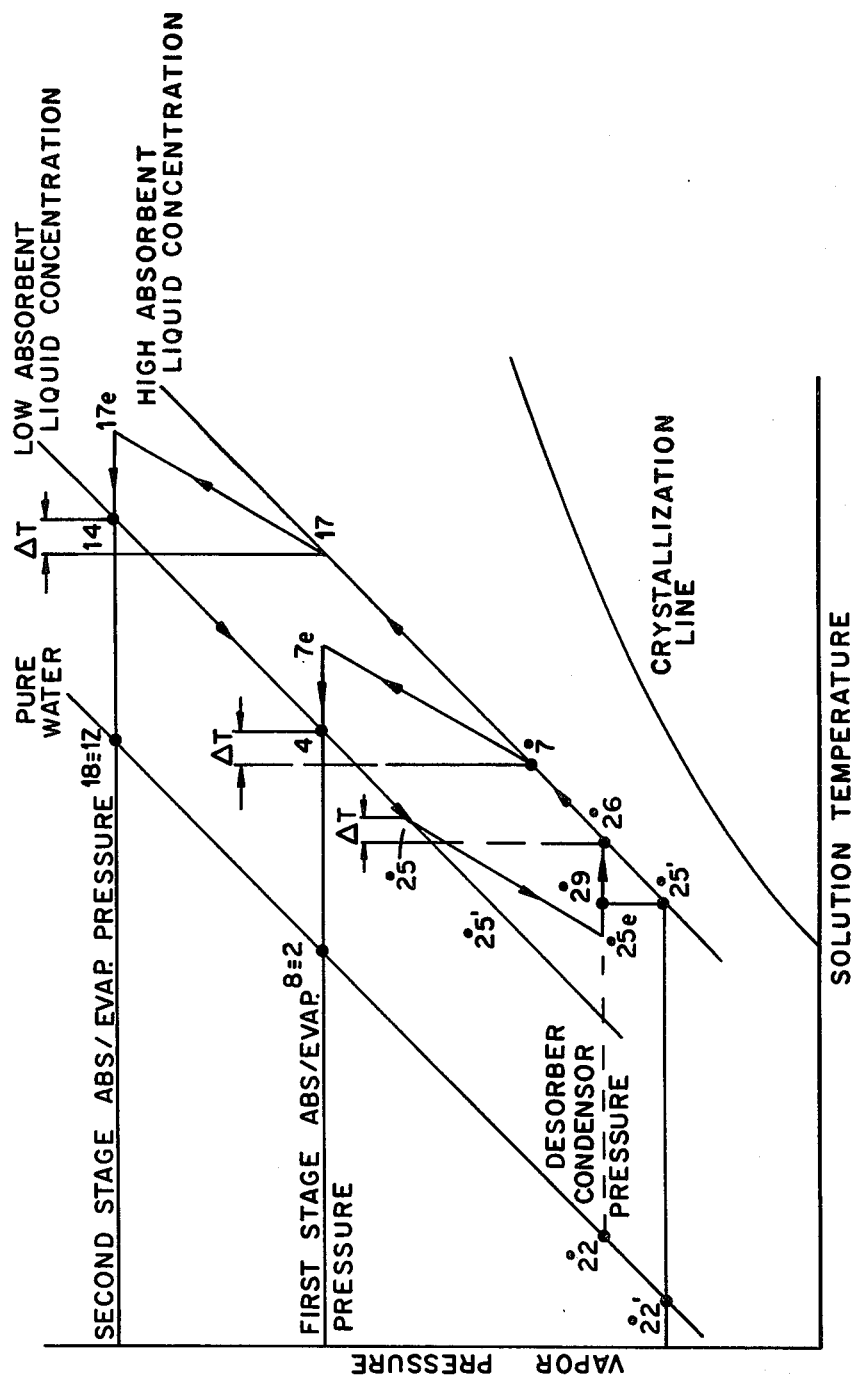
FIG. 4 is an equilibrium diagram for the above-mentioned lithium bromide/water working fluid used in the apparatus illustrated in FIG. 3.

Reference numbers provided with superposed dots in FIGS. 1 and 3 correspond with those included in the equilibrium diagrams shown in FIGS. 2 and 4 for the states of the absorbent liquid in the conventional and improved absorption heat pump cycles.

Essentially, the invention consists of using a portion of the water which is not vaporized in the second stage evaporator 82 to assist in the desorption process in desorber 40. This requires only the described of additional heat transfer surface in the desorber and minor piping changes. Moreover, the improvement provided by the invention makes use of the available low-grade heat to a maximum and uses the second stage evaporator output only as needed.

Although not shown in FIGS. 1 and 3 for the sake of simplicity, the above-described absorption heat pump systems are advantageously provided with gas-liquid contactors of the type described in U.S. patent application Ser. No. 388,875, filed on June 16, 1982, by Gershon Grossman and Horacio Perez-Blanco, the disclosure of which application is intended to be incorporated herein by this reference thereto. More specifically, the first stage absorber 18 includes a gas-liquid contactor of the type designated 68 in FIG. 6 of the application filed by Grossman and Perez-Blanco, the second stage absorber 74 includes a gas-liquid contactor of the type designated 68a in the same drawing of that application, and desorber 40 includes a gas-liquid contactor of the type designated 70 in the same drawing. As explained in the cited Grossman and Perez-Blanco application, these gas-liquid contactors improve the performance of a two-stage absorption heat pump system by including adiabatic steps in the absorbers and desorbers thereof, and the operation of the heat pump systems illustrated in FIGS. 1 and 3 will be explained by reference to the equilibrium diagrams FIGS. 2 and 4, which include these adiabatic steps in the illustrated cycles.

The operation of the conventional absorption heat pump system will first be explained, with reference to the state notations included in FIGS. 1 and 2. Water at the source temperature $T_i$ (state 1) enters first stage evaporator 16 where part of it is converted to vapor (state 8), and the remainder leaves the evaporator at a lower temperature (state 2). The vapor generated in evaporator 16 is absorbed by concentrated absorbent liquid entering first stage absorber 18 at state 7 and leaving that absorber in diluted state 4. The heat of absorption in absorber 18, which is generated at a temperature higher than $T_i$, boosts the temperature of the water entering heat exchanger 66 in the absorber from state 3 to state 9. As stated hereinbefore and illustrated in FIG. 1, the water at state 9 is split into two fractions, one entering second stage evaporator 82 to provide vapor at state 18 and the other passing to heat exchanger 100 where its temperature is boosted from state 13 to state 19. Water 90 not vaporized in evaporator 82 is at state 12 and is combined with waste heat at state 10 in conduit 84 to form the stream entering heat exchanger 18 of first stage absorber at state 3.

Both absorbers of the system operate between the same high and low absorbent liquid concentrations and are served by one desorber 40. Waste heat at state 20 is used in desorber heat exchanger 48 to evaporate water from the diluted absorbent liquid entering desorber 40 at state 25, thereby concentrating the absorbent liquid to state 26. The absorbed vapor at state 27 is condensed in condenser 42, which is supplied with cooling water entering heat exchanger 54 at state 23 and leaving it at state 24.

The above description can be followed on the equilibrium diagram shown in FIG. 2, wherein state points for the absorbent liquid are identified. The diagram shows the high and low absorbent liquid concentrations and the transfers from one to the other in the two absorbers and in the desorber. Each of the above transfers includes the aforementioned adiabatic step. Thus in first stage absorber 18, the absorbent solution goes from the concentrated state 7 to state 7e adiabatically and then to dilute state 4. In the diagram, $\Delta T$ and $\Delta T'$ indicate the temperature differentials required for heat transfer in heat exchangers 66 and 48, respectively.

The importance of a low heat sink temperature, or more specifically, a low-condensing temperature at state 22, is evident from an examination of the equilibrium diagram in FIG. 2. That diagram shows, by broken lines, a cycle wherein the condensing temperature in condenser 42 is higher than that having the condensing temperature (state 22) of the cycle represented by solid lines. It is clear that with all other conditions remaining the same, the high concentration of the absorbent liquid in the broken line cycle is lower than in the solid line cycle. As condensing temperature in condenser 42 rises, the desorber 40 operates less efficiently and the concentration of the absorbent liquid therein is reduced, which results in a poor overall coefficient of performance of the heat pump system and a lower temperature boost of the water heated thereby.

Both evaporator/absorber stages 10,76 and the condenser 42 of the conventional and improved absorption heat pump systems illustrated in FIGS. 1 and 3, respectively, operate in the same way, but desorber 40 in the improved apparatus has an auxiliary heat exchanger 114 in addition to the primary heat exchanger 48. In the improved heat pump system, primary heat exchanger 48 is heated with low-grade heat which enters the heat exchanger at state 20 as in the desorber 40 of a conventional system. As shown in FIG. 4, this heat concentrates the absorbent liquid from state 25e to an intermediate concentration at state 29. To concentrate the absorbent liquid further, at state 26, the liquid is passed over auxiliary heat exchanger 114 which, as described hereinbefore, receives part or all of the water which is not vaporized in second stage evaporator 82, depending on the setting of valve 110 and the required conditions of the system. This water, which has been boosted in temperature in first stage absorber 18 before entering evaporator 82, is at a temperature higher than the heat source supplying water to conduits 22 and 84 and therefore can effect desorption additional to that produced by primary heat exchanger 48.

The heat exchanger 114 is one of two heat exchangers supplying the heat of desorption to desorber 40 for the purpose of regenerating or strengthening the absorbent solution entering it at state point 25 and leaving at state point 26. The heat exchanger 48 above heat exchanger 114 in desorber 40 uses low grade heat at the same temperature as that supplied to the first-stage evaporator 16, (typically 60° C. or 140° F.). The heat exchanger 114 receives a stream of hot water from the second-stage evaporator 82 through conduit 112 that has been temperature-boosted in the first-stage absorber 18 and is at a temperature higher than that of the low grade heat supplied to the heat exchanger 48. Typically speaking, if the low grade heat (state points 1 and 20) is at 60° C., then the vapor at the first-stage evaporator 16 (state point 8) would be at 55° C. and the temperature-boosted stream of water out of the first-stage absorber 18 (state point 9) would be at 90° C. This 90° C. water enters the second stage evaporator 82 (state point 11), and after evaporation, yields vapor (state 18) and water (state 12) at 85° C. This water at 85° C. goes through heat exchanger 114. Thus, the desorber 40 is powered by water at 60° C. in upper heat exchanger 48 and water at 85° C. in the lower heat exchanger 114; the former regenerates the absorbent solution partly and the latter completes the regeneration.

The effectiveness of the modified heat pump system in producing good desorption, despite a relatively high condensing temperature, can be recognized by an examination of FIG. 4, which shows the location of absorbent liquid states (indicated by 25' and 26', respectively) for a low condensing temperature (state 22'). With the increased condensing temperature at state 22, it is no longer possible, in the conventional absorption heat pump system of FIG. 1, to achieve the high absorbent liquid concentration obtained with the lower condensing temperature at state 22', as explained hereinbefore in connection with FIGS. 1 and 2. With the improved system, however, the absorbent liquid at state 25 is concentrated as far as possible by means of available waste heat up to state 29 and then is further concentrated by means of water from second state evaporator 82 to the desired concentration at state 26. Note that 26 is at a higher temperature than 26', which makes 25, as well, higher than 25'.

Figure 5:
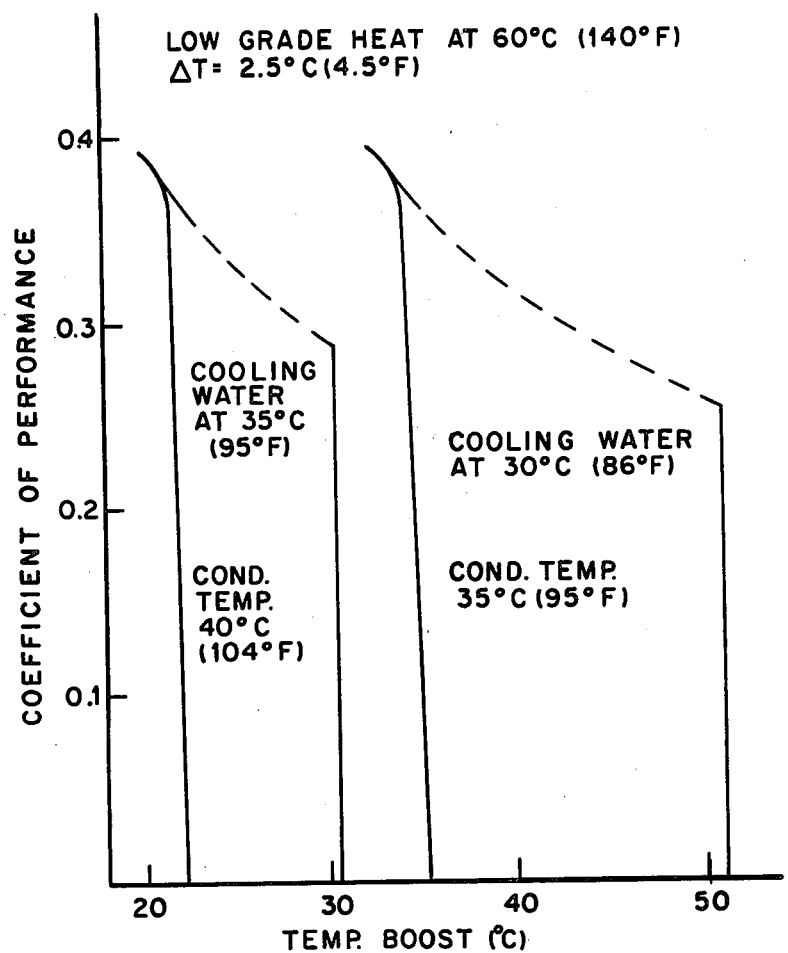
FIG. 5 is a graph showing coefficient of performance curves versus temperature boost for the conventional and improved heat pumps illustrated in FIGS. 1 and 3, respectively.

A computer simulation of the operation of the old and improved heat pump systems which have been described has provided the quantitative performance curves of the coefficient of performance versus temperature boost of water in the systems that are shown in FIG. 5, wherein the two solid line curves refer to the system without the improvement provided by the invention and the two broken line curves refer to the improved system. The two sets of curves are for operation of the two systems with a cooling water temperature of 35° C. (95° F.) and 30° C. (86° F.) and a corresponding condensing temperature of 40° C. (104° F.) and 35° C. (95° F.), respectively. The low-grade heat source is at a constant temperature of 60° C. (140° F.), and the evaporation temperatures in the first and second stages 10,76 (states 8 and 18 in FIGS. 1 and 3) were selected so as to flash evaporate 1% of the streams discharged into the evaporators 16,82 thereof. All heat exchangers in the systems are characterized by a closest approach temperature of $\Delta T=2.5°$ C. (4.5° F.), which corresponds to a logarithmic mean $\Delta T$ varying around 5° C. (9° F.) in most cases.

FIG. 5 shows a very steep operating curve for the unimproved system, which gives an almost constant temperature boost. With the improvement of the invention, the temperature boost is increased from about 22° C. to 30° C. in the case of 35° C. cooling water and from about 35° C. to 50° C. in the case of 30° C. cooling water. The increase in temperature boost is attained at the cost of a reduced coefficient of performance.

Among the advantages of an absorption heat pump system constructed in accordance with the principles of the invention are the following: (1) higher temperatures than can be obtained by the conventional absorption heat pump cycle are possible under the same operating conditions (temperatures of the low-grade heat supply and cooling medium); (2) it is possible to operate under conditions of a small temperature differential between the heat source and sink; (3) the low-grade heat is utilized to a maximum to obtain a coefficient of performance as high as possible under given conditions; and (4) the additional hardware required in the improved absorption heat pump system is minimal.

What is claimed is:

1. In an absorption heat pump system having a chamber in which a first liquid is introduced, a portion of said first liquid being converted to vapor in said chamber and the remainder of said first liquid which is not converted to vapor in said chamber being withdrawn therefrom, an absorber receiving said vapor from said chamber, a heat exchanger in said absorber for boosting the temperature of a liquid passed through said heat exchanger, first liquid distributor means associated with said heat exchanger in said absorber for distributing an absorbent liquid thereon, said vapor being absorbed into said absorbent liquid as an additional component thereof in said absorber and thereby generating heat which boosts the temperature of said liquid passed through said heat exchanger in said absorber, a desorber, a primary heat exchanger in said desorber, second liquid distributor means associated with said primary heat exchanger in said desorber for distributing liquid thereon, means for conducting said absorbent liquid containing said additional component therein from said absorber to said second liquid distributor means for distribution on said primary heat exchanger, said additional component being released from said absorbent liquid after being discharged from said second liquid distributor means in said desorber, and conduit means for conducting said adsorbent liquid from said desorber back to said first liquid distributor means, the improvement comprising:
    an auxiliary heat exchanger positioned in said desorber so that said absorbent liquid is distributed thereon after it has been distributed on said primary heat exchanger; and
    means for passing through said auxiliary heat exchanger a portion of said first liquid which is not converted to vapor in said chamber.

2. The system defined in claim 1 wherein said first and second liquid distributor means both comprise spray nozzles.

3. An absorption heat pump system comprising:
    a first stage evaporator/absorber vessel the interior of which comprises a flash chamber and an adsorber section communicating therewith, at least one spray nozzle in said flash chamber, at least one spray nozzle in said absorber section, and a heat exchanger positioned below said spray nozzle in said absorber section;
    a second stage evaporator/absorber vessel the interior of which comprises a flash chamber and an absorber section communicating therewith, at least one spray nozzle in said flash chamber, at least one spray nozzle in said absorber section, and a heat exchanger positioned below said spray nozzle in said absorber section;
    a desorber/condenser vessel the interior of which comprises a desorber section and a condenser section communicating therewith, at least one spray nozzle in said desorber section, a primary heat exchanger positioned below said spray nozzle in said desorber section, and an auxiliary heat exchanger positioned below said primary heat exchanger in said desorber section;
    first and second recuperator heat exchangers;
    conduit means for feeding liquid of low grade heat to said spray nozzle in said flash chamber of said first stage evaporator/absorber vessel;
    conduit means for feeding liquid of low grade heat to said heat exchanger in said absorber section of said first stage evaporator/absorber vessel;
    conduit means for passing liquid from said absorber section of said first stage evaporator/absorber vessel through said first recuperator heat exchanger and thence to said spray nozzle in said desorber section of said desorber/condenser vessel;
    conduit means for passing a first portion of liquid from said desorber section of said desorber/condenser vessel through said first recuperator heat exchanger and thence to said spray nozzle in said absorber section of said first stage evaporator/absorber vessel;
    conduit means for passing a second portion of liquid from said desorber section of said desorber/condenser vessel through said second recuperator heat exchanger and thence to said spray nozzle in said absorber section of said second stage evaporator/desorber vessel;

conduit means for passing liquid from said absorber section of said second stage evaporator/absorber vessel through said second recuperator heat exchanger to said spray nozzle in said desorber section of said desorber/condenser vessel;

conduit means for passing a first portion of liquid from said flash chamber of said second stage evaporator/absorber vessel to said heat exchanger in said absorber section of said first stage evaporator/absorber vessel;

conduit means for passing a second portion of liquid from said flash chamber of said second stage evaporator/absorber vessel to said auxiliary heat exchanger in said desorber section of said desorber/condenser vessel;

conduit means for passing a first portion of liquid from said heat exchanger in said absorber section of said first stage evaporator/absorber vessel to said heat exchanger in said absorber section of said second stage evaporator/absorber vessel; and conduit means for passing a second portion of liquid from said heat exchanger in said absorber section of said first stage evaporator/absorber vessel to said spray nozzle in said flash chamber of said second stage evaporator/absorber vessel.

* * * * *